(12) United States Patent
Hunicke-Smith et al.

(10) Patent No.: US 6,800,250 B1
(45) Date of Patent: Oct. 5, 2004

(54) POLYMER SYNTHESIZER

(76) Inventors: Scott P. Hunicke-Smith, 58 Henderson Pl., Menlo Park, CA (US) 94025; Robert Guettler, 2616A 25th St., San Francisco, CA (US) 94110; Jimmy Tiansing Koh, 34A Sheridan St., San Francisco, CA (US) 94103

( * ) Notice: Subject to any disclaimer, the term of this patent is extended or adjusted under 35 U.S.C. 154(b) by 0 days.

(21) Appl. No.: 09/527,106

(22) Filed: Mar. 16, 2000

Related U.S. Application Data

(60) Provisional application No. 60/125,262, filed on Mar. 19, 1999.

(51) Int. Cl.[7] .............................................. B01J 19/00
(52) U.S. Cl. ......................... 422/65; 422/100; 422/129; 422/66; 422/130; 422/131; 422/134; 436/43; 436/44; 436/46; 436/47; 435/287.2; 435/286.4; 435/286.5; 435/287.3
(58) Field of Search ............................ 422/100, 65, 66, 422/129–131, 134; 436/43, 44, 46, 47; 435/287.2, 286.4, 286.5, 287.3

(56) References Cited

U.S. PATENT DOCUMENTS

| | | | | |
|---|---|---|---|---|
| 3,327,535 A | * | 6/1967 | Sequeira | 73/863.32 |
| 3,799,744 A | * | 3/1974 | Jones | 422/65 |
| 3,814,582 A | * | 6/1974 | Rohrbauch et al. | 436/43 |
| 3,985,508 A | * | 10/1976 | Williams | 422/65 |
| 4,298,570 A | * | 11/1981 | Lillig et al. | 422/64 |
| 4,692,308 A | * | 9/1987 | Riley et al. | 422/65 |
| 4,727,033 A | * | 2/1988 | Hijikata et al. | 436/69 |
| 4,738,824 A | * | 4/1988 | Takeuchi | 422/63 |
| 5,096,670 A | * | 3/1992 | Harris et al. | 422/65 |
| 5,279,721 A | * | 1/1994 | Schmid | 204/457 |
| 5,294,404 A | * | 3/1994 | Grandone et al. | 422/64 |
| 5,368,823 A | | 11/1994 | McGraw et al. | |
| 5,472,672 A | | 12/1995 | Brennan | |
| 5,519,635 A | * | 5/1996 | Miyake et al. | 700/285 |
| 5,529,756 A | | 6/1996 | Brennan | |
| 5,541,314 A | | 7/1996 | McGraw et al. | |
| 5,551,487 A | | 9/1996 | Gordon et al. | |
| 5,660,792 A | * | 8/1997 | Koike | 422/63 |
| 5,837,858 A | | 11/1998 | Brennan | |

FOREIGN PATENT DOCUMENTS

EP           351988 A2 *  1/1990   ......... G01N/35/02

OTHER PUBLICATIONS

"First Mate," by Argonaut Technologies, www.argotech.com/newdirections/firstmate/index.html.

* cited by examiner

*Primary Examiner*—Jill Warden
*Assistant Examiner*—Elizabeth Quan
(74) *Attorney, Agent, or Firm*—Rader, Fishman & Grauer PLLC

(57) ABSTRACT

A polymer synthesizer is disclosed which has a base on which sits a synthesis case, a synthesis block, and a means of moving the synthesis block and supports for a reagent shelf. The synthesis case has a loading station, drain station, and a water tolerant reagent area and a water sensitive reagent dispensing area. The synthesis case has a cover, a first and a second side, a first and a second end, and a bottom side which contacts the base. The bottom side of the synthesis case has a top face in which there are tracks. A synthesis block moves back and forth in the synthesis case and has a top face and an opening in the top face for a synthesis plate with a plurality of wells. The synthesis block also has a collection area under the synthesis plate to drain spent reagents or optionally hold a sample plate. The polymer synthesizer also has a means of moving the synthesis block back and forth in the synthesis case, preferably a pulley, cable and motor. The polymer synthesizer also has a means of draining the liquid from the synthesis plate. A method of synthesizing oligonucleotides with the polymer synthesizer also is disclosed.

6 Claims, 7 Drawing Sheets

POLYMER SYNTHESIZER

This application claims the benefit of U.S. Provisional Application No. 60/125,262, filed Mar. 19, 1999.

TECHNICAL FIELD

The present invention relates to polymer synthesis. More particularly, the present invention is an improved apparatus for the robotic synthesis of polymers.

BACKGROUND OF THE INVENTION

DNA synthesis is presently performed on automated instruments which are capable of concurrently producing multiple DNA segments. Frequently the apparatus uses reaction columns in which a support material for the reaction is positioned within the columns on top of inert, porous filters, referred to as frits. The support material generally has a starter material bound to the support onto which desired oligonucleotides may be synthesized. The reaction columns are placed within the automated apparatus and chemicals are added to the columns in sequence in appropriate amounts in an automated fashion. In order to address today's large demand for high throughput oligosynthesis, most automated apparatuses have a large footprint and take up a great deal of premium laboratory space.

Most currently known automated synthesizers can produce only a few oligonucleotides at a time, which is limited by the number of reaction columns located within the machines. The number of reaction columns is limited as a practical matter by the increased complexity of the plumbing and valving network, as the number of columns increases. In addition, the system must be air tight to avoid contaminating the chemicals with air or water and to avoid human exposure to the chemicals.

U.S. Pat. No. 5,368,823 issued Nov. 29, 1994, and U.S. Pat. No. 5,541,314 issued Jul. 30, 1996, address the need for producing a large number of oligonucleotides by disclosing a method and apparatus for oligonucleotide synthesis in which the plumbing and valving network is simplified. The patents disclose a system in which there is one supply line and one outlet located in the synthesis chamber for the delivery of reagents into the reaction columns. The outlet can be positioned above the inlet end of each of the columns so that nucleotide reagents, capping reagents, deblocking reagents, wash chemicals, etc. can be provided to each of the reaction columns. All of the reagents are located in a supply system which includes reservoirs and valving to connect the reservoirs with the supply line. A flush/prime column is also located within the chamber so that the supply line can be flushed and primed between each different chemical reagent addition. A vacuum source, located outside of the reaction chamber, is connected to the outlet end of the reaction columns to rapidly draw the chemicals from all columns simultaneously, thus leaving the columns dry and ready to receive the next reagent.

The disclosed apparatus in these two patents provides multiple reaction columns, but the single supply line requires flushing and priming between the addition of each reagent. These steps are time consuming and waste reagents. Moreover, a large footprint is required to accommodate a reaction chamber encompassing a) the moving supply line and b) the reaction chambers as well as a vacuum source outside of the reaction chamber. The large footprint is a drawback to space-constrained laboratories.

Another group of patents, U. S. Pat. No. 5,472,672 issued Dec. 5, 1995, U.S. Pat. No. 5,529,756 issued Jun. 25, 1996, and U.S. Pat. No. 5,837,858 issued Nov. 17, 1998, addresses the need for high throughput oligosynthesis by disclosing a polymer synthesis apparatus with many stationary supply lines. The patents disclose an apparatus with a head assembly with many nozzles, with each nozzle coupled to a reagent reservoir. Further, a base assembly has at least one reaction well but can utilize 96-well and other plates. A transport mechanism is coupled to the head assembly and/or base assembly to produce relative movement between the two. The transport mechanism moves horizontally to align a selected reaction well and a selected nozzle to deposit a selected liquid reagent into the reaction well for synthesis of a polymer chain. A sliding seal is positioned between the head assembly and the base assembly to form a common chamber that encloses both the reaction wells and nozzles therein. The seal is constantly being rubbed down by the movement of the metal piece back and forth to move the synthesis block. This wearing down of the seal results in a less efficient seal.

What is needed in modern biological research is a robust, compact and efficient high throughput system for the synthesis of polymers, specifically oligonucleotides.

SUMMARY OF THE INVENTION

A polymer synthesizer is disclosed which has a base on which sits a synthesis case, a synthesis block, a means of moving the synthesis block and supports for a reagent shelf. The synthesis case has a loading station, drain station, and water-tolerant and water-sensitive reagent filling stations. The synthesis case has a cover, a first and a second side, a first and a second end, and a bottom side, which contacts the base. The bottom side of the synthesis case has a top face in which there are tracks for the synthesis block. A synthesis block moves back and forth inside the synthesis case and has a top face and an opening in the top face for a synthesis plate with a plurality of wells. The synthesis block also has a collection area under the synthesis plate to drain spent reagents and to optionally accommodate a sample tray. The polymer synthesizer also has a means of moving the synthesis block back and forth in the synthesis case. The load station has a sealable opening through which a multiwell plate is inserted into the synthesis block. The reagent shelf is connected to the upper ends of the supports, which are capable of supporting a plurality of reagent, containers, each reagent container having a tube connecting to a gas source which is used to expel a controlled amount of reagent from the container. The reagent container also dispenses reagent through a tube whose other end connects to a valve that has additional tubes connected to multi-channel manifolds, which in turn have tubes connecting to nozzle blocks at the aqueous and non-aqueous filling stations. The valves are actuated by the computer to dispense fluid to desired wells in the multiwell plate. The polymer synthesizer also has a means of draining the liquid from the synthesis plate. The means for moving the synthesis block can include a pulley, cable and motor.

The means for draining liquid from the synthesis plate can include a pressurized gas source, a pressurized gas inlet on the synthesis case, a pressure plate, a support block, a diaphragm which forms a seal between the top plate and one side of the pressure plate and the support block, a motive means connected to the pressure plate and capable of moving the pressure plate up, and at least one sealing gasket to contact and form a seal with the synthesis plate. The gas enters through the pressurized gas inlet and presses down the diaphragm, which in turn lowers the pressure plate and gasket to form a seal over the synthesis block and increases pressure above the wells, which expels the liquid contents of the wells. The motive means for returning the pressure plate to its original position can be a set of springs.

An automated method of draining synthesis wells in a polymer synthesizer includes the steps of providing the drain station disclosed above, supplying pressurized gas at the pressurized gas inlet, increasing a distensible space between the pressure plate and the diaphragm, pressing down the diaphragm for contact of the gaskets on the pressure plate with the multiwell plate, creating a seal with the multiwell plate, compressing the gasket and the space at each well's inlet, and expelling liquid or reagents present in the well from the well outlets.

In another embodiment, there is disclosed an automated method for synthesizing polymers, specifically oligonucleotides.

A further understanding of the nature and advantages of the inventions herein may be realized by reference to the remaining portions of the specification and the attached drawings.

DETAILED DESCRIPTION OF THE INVENTION

The disclosed automated polymer synthesizer is more efficient than existing polymer synthesizers due to its internal pulley system for moving the reaction wells and internal pressure station. These features provide a smaller footprint without loss of speed. The disclosed apparatus has a stationary seal only on the pressure filtration station. This smaller seal in one location is more robust than a large seal surrounding the entire synthesis area. The seal is robust and is slow to wear down.

The synthesis case has a top plate through which nozzles dispensing reagents enter in one of two sets of spaced-apart nozzle blocks. A synthesis block carrying reaction wells for the synthesis of oligos moves back and forth between the two sets of slots and a drain station. Each synthesis well has a filter above the well's outlet. The filter density is such that fluids are retained in the synthesis wells long enough to allow for synthesis. The filter retains the fluid in the well until a pressure differential is applied to force fluid through the filter at the drain station. The synthesis block is not large enough to be under both sets of slots (and all nozzles) at once. There is no permanent seal between the synthesis plate and the top plate, a seal exists between the synthesis block only during the pressure filtration step of synthesis. The apparatus is entirely enclosed with a stationary seal between the top plate and the case inside which the synthesis block is propelled back and forth.

In operating the apparatus according to a desired sequence of reagent application, each of the wells is designated to receive specific reagents. A computer with associated electronics and software controls all aspects of the process including the opening and closing of valves for the proper time period thereby dispensing the appropriate volume of liquid and in correct sequence, the movement of the supply line outlet, the provision of the proper incubation period for each reagent addition to the columns and the evacuation of the columns after the incubation period is complete.

Figure 1:
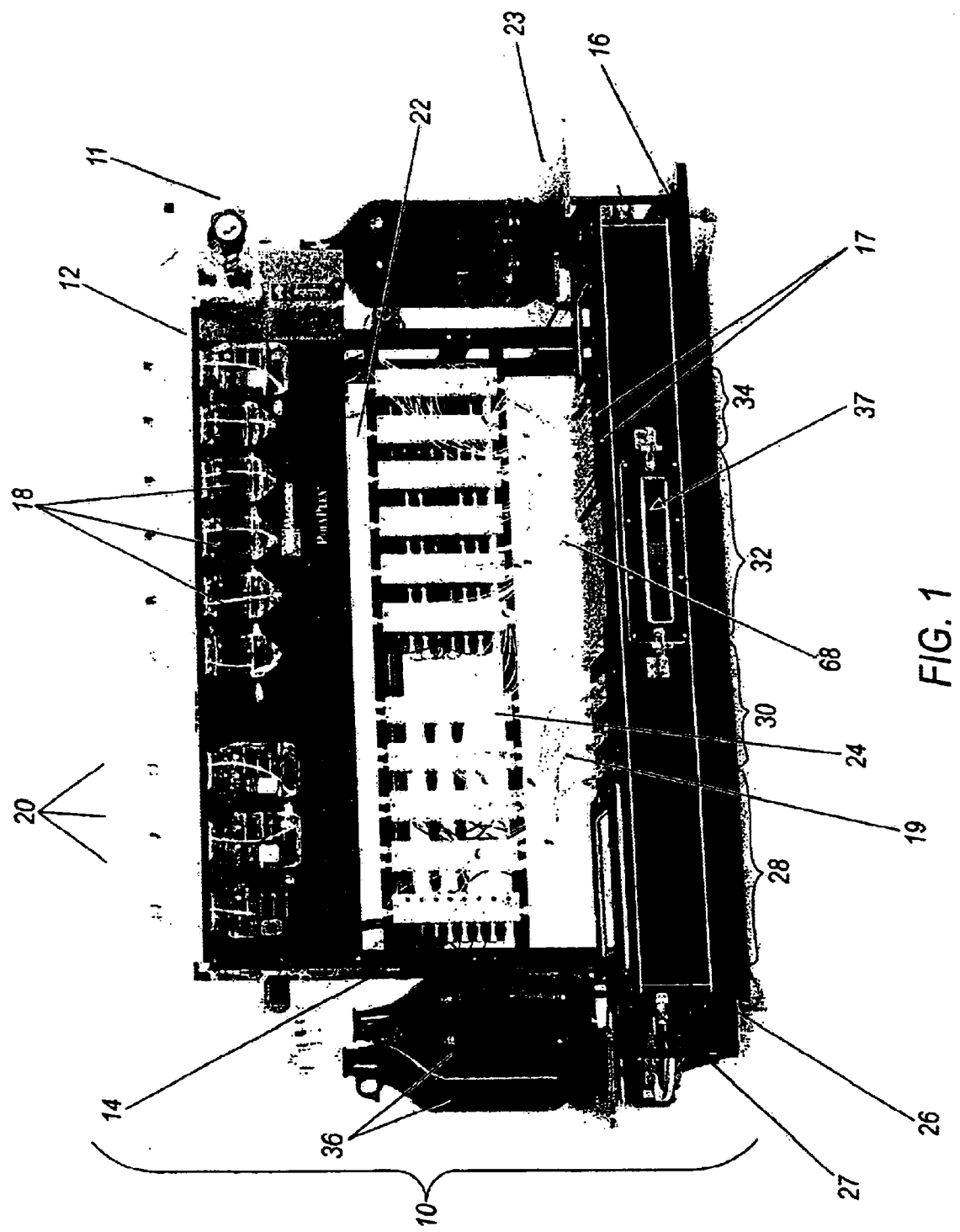
FIG. 1 is a color photograph of the polymer synthesizer.

As shown in FIG. 1, and beginning at the top, the inventive polymer synthesizer 10 provides a reagent shelf 12 for the various reagents involved in oligosynthesis. This area is open and easy to reach for preparing for synthesis activity. The reagent shelf 12 is held up by supports 14. The supports 14 are also fixed to the base 16. The reaction shelf 12 has a plurality of holes in which reagent containers 18 are placed. The reagent shelf 12, the supports 14, and base 16 are preferably made of a nonreactive material such as anodized aluminum. There are tubes 20 which connect the reagent containers 18 with a pressure source 11 and there are tubes that connect the containers 18 with valves at the back of the apparatus (not shown) that are connected to multichannel manifolds 24 which in turn connect to the nozzle blocks 17 located at the reagent filling stations by another set of tubes 19. The tubes are preferably made of Teflon® or other minimally reactive flexible material.

The case 26 has different locations for activities that need to be isolated. The case 26 is preferably made of anodized aluminum. Starting at the left end of the case 26, there is a load station 28, a filling station for water-tolerant reagents 30, a drain station 32, and a water-sensitive filling station 34 for reagents which are sensitive to water and/or air. As shown here, the opening 68 in the top of the case accommodates a positive pressure station to cause reagents to drain from the synthesis block when it is present in the drain station 32. The side opening of the drain station 37 permits there to be removal of an optional tray under the synthesis block (see FIG. 3). Such a tray can obtain spent reagents for analytical tests. Argon (not shown) is fed into an opening (not shown) in the case 26 on the side nearest the water-sensitive reagent filling station 34 and flows through the case 26 and exits the opposite end 27. The argon fills the case and creates an inert environment for synthesis. There are also large containers 36 for holding acid and other reagents necessary for synthesis. Preferably, these containers 36 are located at either end of the case 26 on platforms 23 located above the base 16, which makes changing solutions more convenient than smaller containers on top of the reagent shelf.

Figure 2:
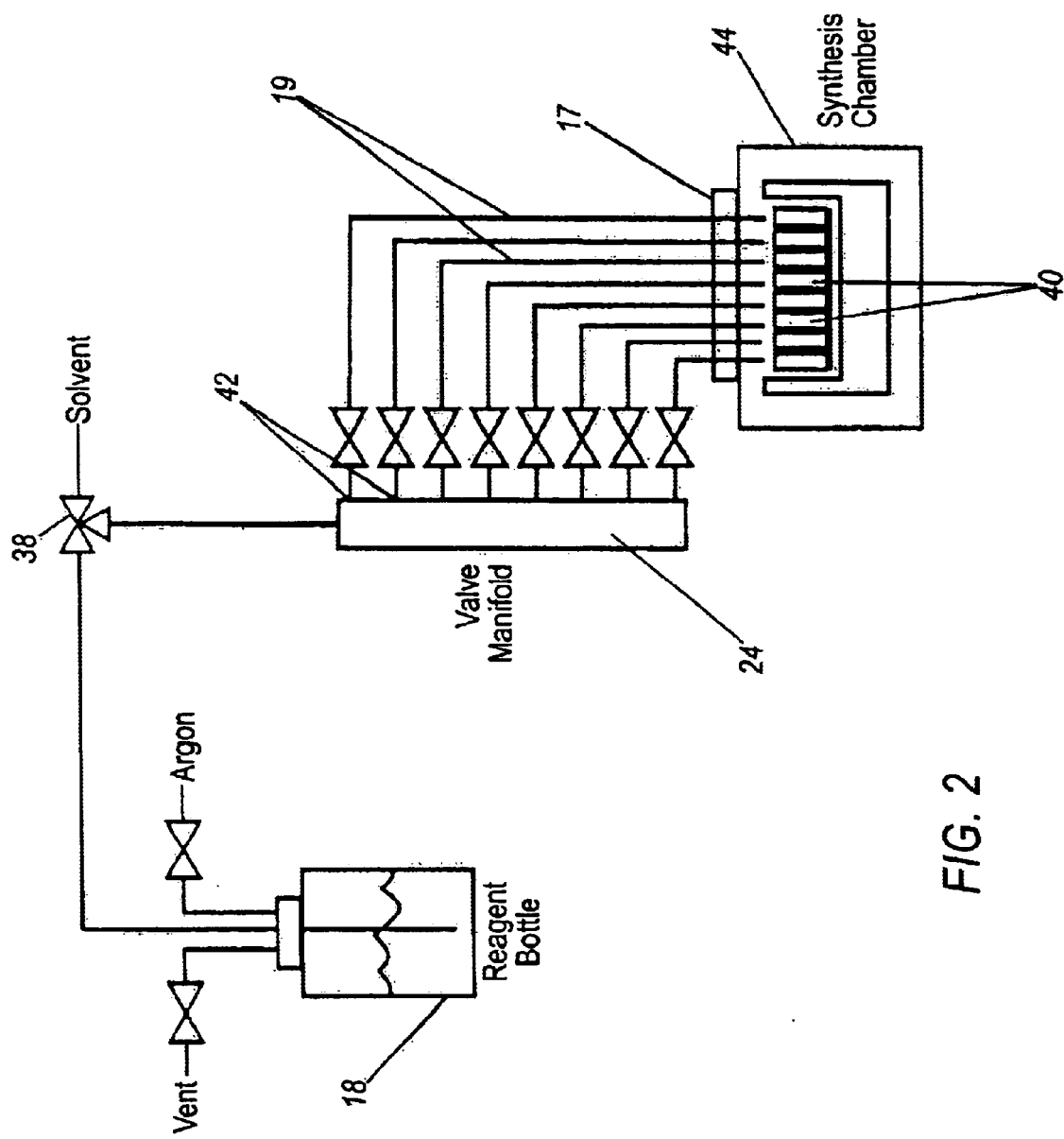
FIG. 2 is a schematic of the valve and manifold system of the polymer synthesizer.

FIG. 2 is a detailed illustration of the delivery of the reagents from the reagent bottles 18 to the synthesis wells 40. There is a Y valve 38 that is on or off depending on whether the delivery of a reagent or a solvent is desired. When the Y valve 38 is on, the reagent flows through to the multichannel manifold 24. When the Y valve 38 is off, the solvent flows through to the multichannel manifold 24. The reagent or solvent can then be delivered in the desired amount to synthesis wells 40 through up to eight channels 42 at one time. Each channel 42 is connected to a nozzle on the nozzle block 17 through a tube 19 for dispensing into each synthesis well 40 located in the synthesis block 44.

Figure 3:
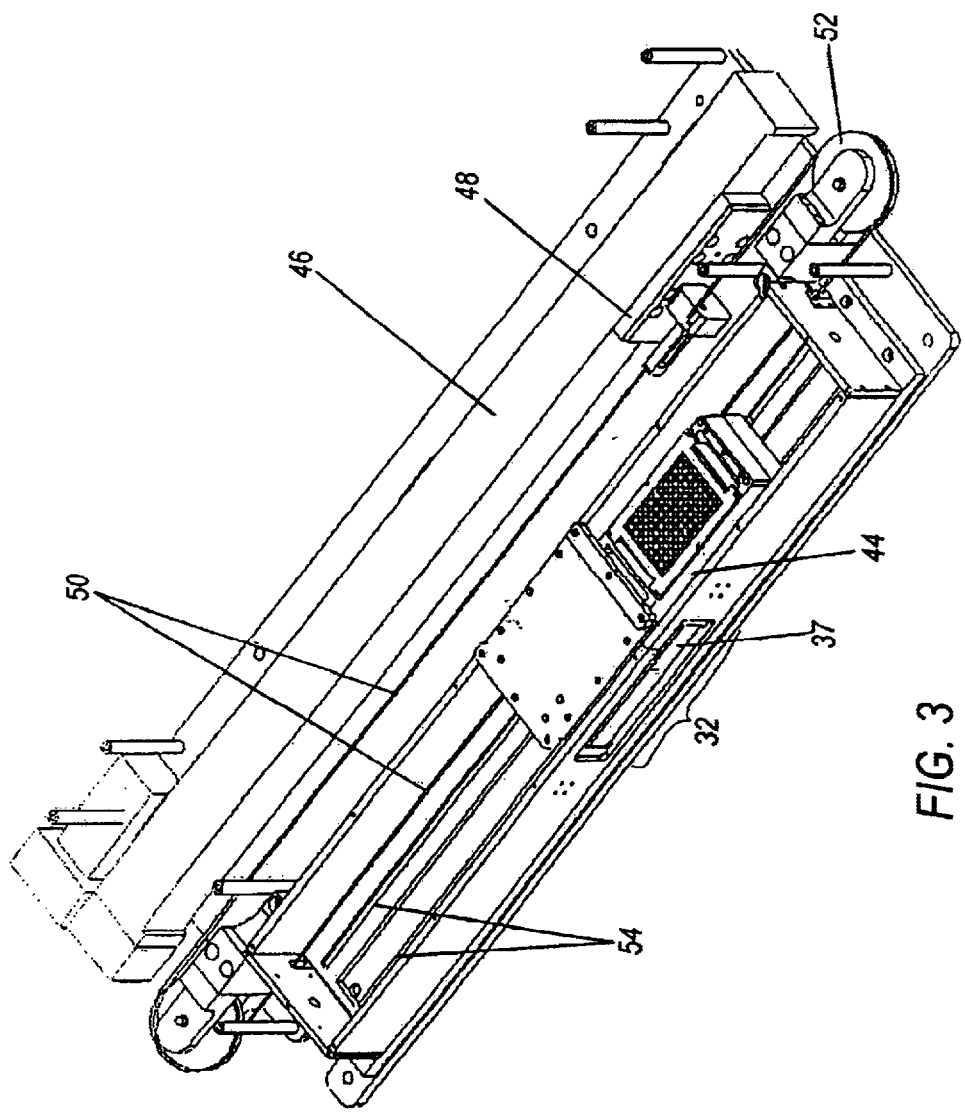
FIG. 3 is a view of the inside of various areas of the polymer synthesizer.

FIG. 3 shows a motive means or actuator 46 located on the base (not shown). The actuator 46 houses a motor (not shown) and has a mounting plate 48 mounted on the side of the actuator closest to the elongated case 26. Mounting plate 48 also attaches to a cable 50 that wraps around two pulleys 52 located at either end of the elongated case 26 creating a pulley system. The cable is preferably made out of stainless steel. In this cutaway view, cable 50 is seen to run the length of the synthesis case 26. It attaches to the side of the synthesis block (not shown) and precisely locates the synthesis block 44 under the reagent dispensing tips. The synthesis block 44 moves back and forth over tracks 54. The tracks 54 and the contact points on the synthesis block are preferably made of, or at least coated with, Teflon® so that the synthesis block slides smoothly.

Figure 4:
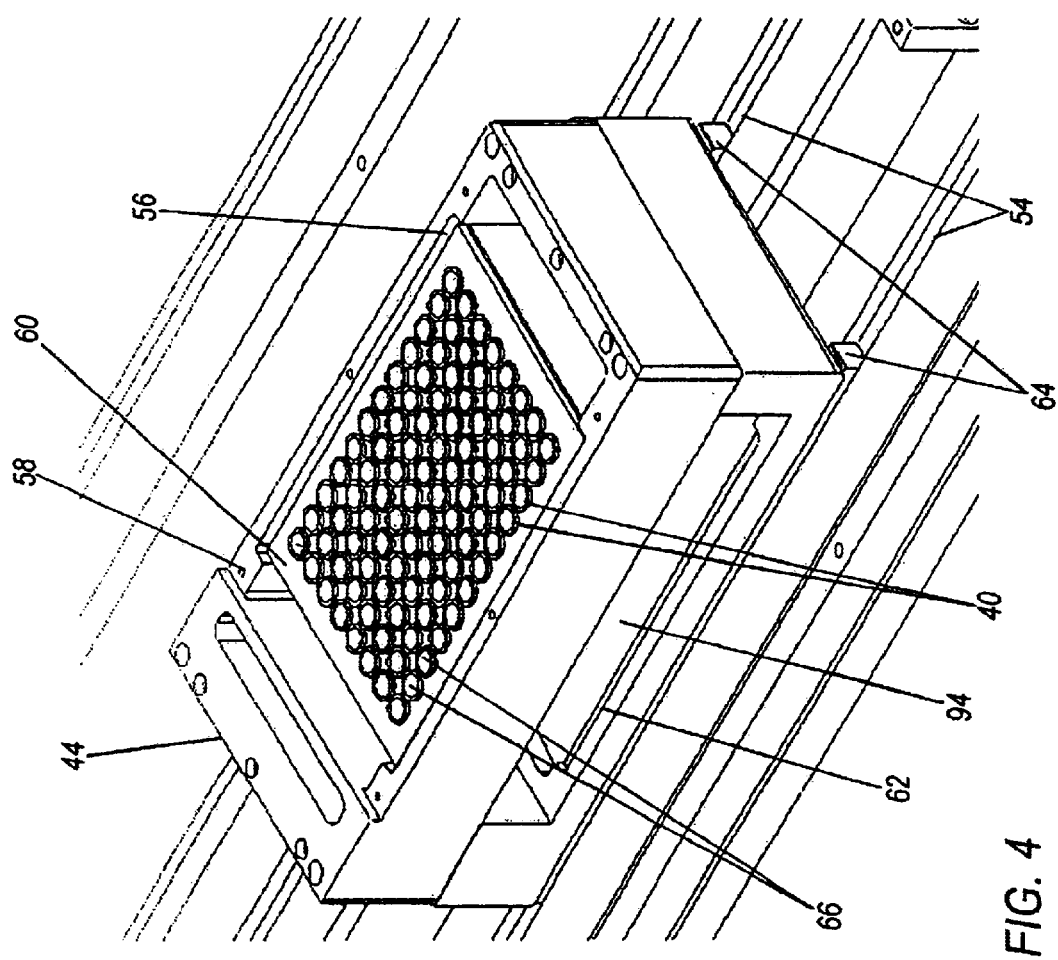
FIG. 4 is a detailed view of the synthesis block and shows its relationship to the motive means.

The synthesis block 44 is shown in greater detail in FIG. 4. The synthesis block 44 provides a metal frame 58 to hold a 96-well plate 56. Preferably, the block frame 58 has grooves 60 to permit the 96-well plate 56 to "nest" in the synthesis block 44 for precise positioning of the synthesis wells 40. The synthesis block 44 has a collection area 94 underneath the 96-well plate 56 to drain reagents. In the preferred embodiment shown, the collection area 94 also has grooves 62 to accommodate a tray (e.g., a 96-well sample collection tray) to collect samples for analysis. After a multiwell plate is "nested" into the synthesis block 44, a gasket and metal frame are placed on the periphery of the top of the synthesis block 44, sealing the multiwell plate 56 into place and enabling the precise loading of reagents. This view shows one of the Teflon rails 64 on which the synthesis block 44 moves like a sled in the track 54. Each synthesis well 40 has an open inlet end 66 and an outlet end (not shown).

Each synthesis well 40 has a filter (see FIG. 6) on top of which rests a support material, such as Controlled Pore Glass beads, on which the synthesis of polymers takes place. The filters keep the synthesizing polymer from exiting the synthesis wells 40 and have a fiber density such that the reaction fluids do not empty unless pressure is applied in the drain station 32 (see below). The filters are preferably made of a nonreactive type of polymer. Positive pressure may be applied above the synthesis wells 40, or negative pressure below the synthesis wells may be applied in order to collect the spent reagents.

Figure 5:
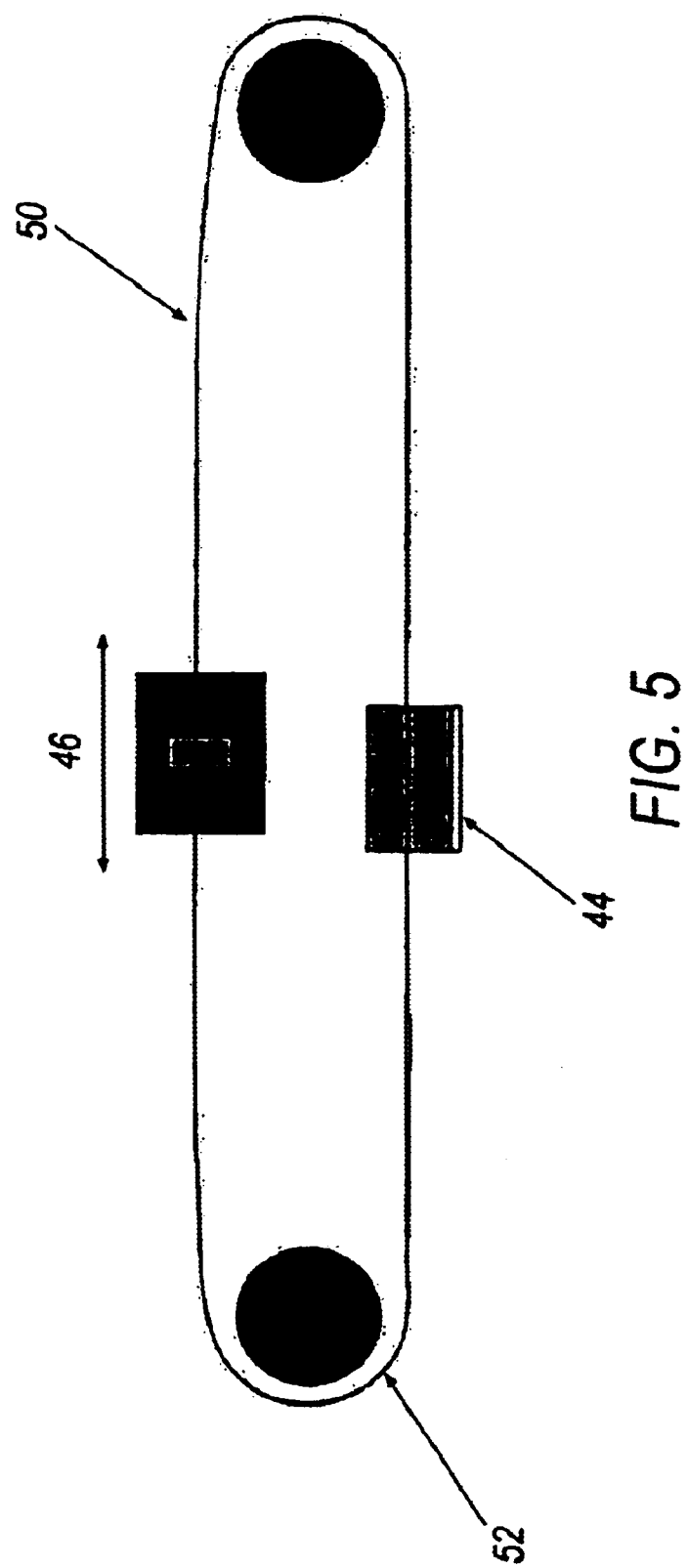
FIG. 5 is a schematic of the motive means, typified as a cable drive system.

FIG. 5 schematically shows the preferred pulley system. The actuator 46 or the motive means can be attached to the cable 50 or directly connected to one of the pulleys 52. The motive means can be any type of motor, gear, or other apparatus that precisely positions the synthesis block 44 to receive reagents.

Figure 6:
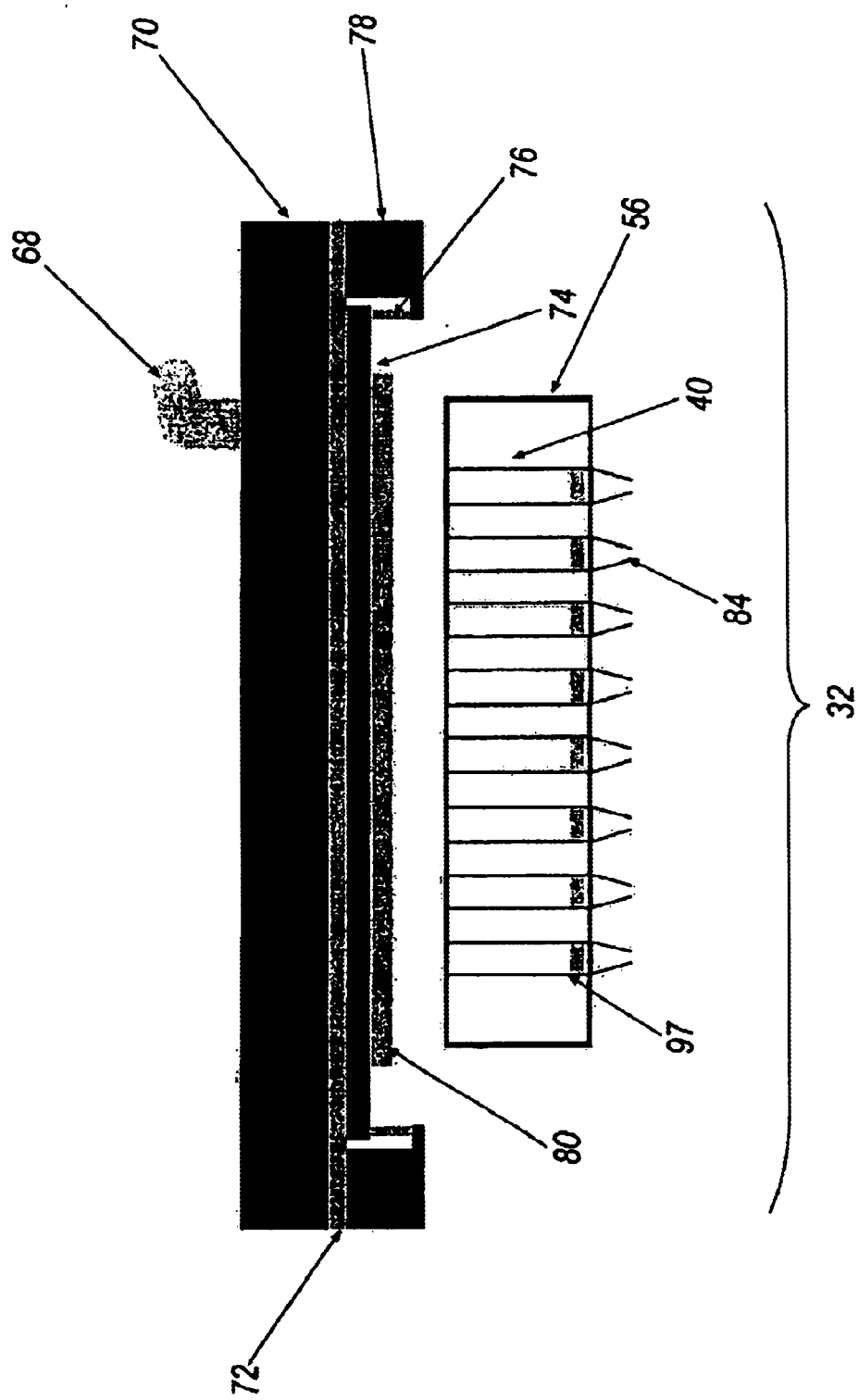
FIG. 6 is a schematic of the drain station, typified as a positive pressure filtration unit and shown at rest.

The drain station 32 at rest is shown schematically in more detail in FIG. 6. The presently preferred embodiment provides for the application of positive pressure, although the station may operate with positive or negative pressure. The portion of the apparatus shown in FIG. 6 fits into the drain station 32 between the water-sensitive reagent and water-tolerant filling stations of FIG. 1. A pressurized gas inlet 68, which is valved (not shown) and connected to a remote pressure source (not shown), enters the rigid top plate 70 of the drain station 32. Below the top plate 70 is a diaphragm 72 which forms a seal between the top plate and one side of the pressure plate 74 and support block 78. The bottom side of the pressure plate 74 is connected to springs 76 that are in turn connected to the support block 78. The bottom side of the pressure plate is also connected to at least one sealing gasket 80. Located below the sealing gasket 80 is a multiwell plate 56 with a plurality of synthesis wells 40.

Figure 7:
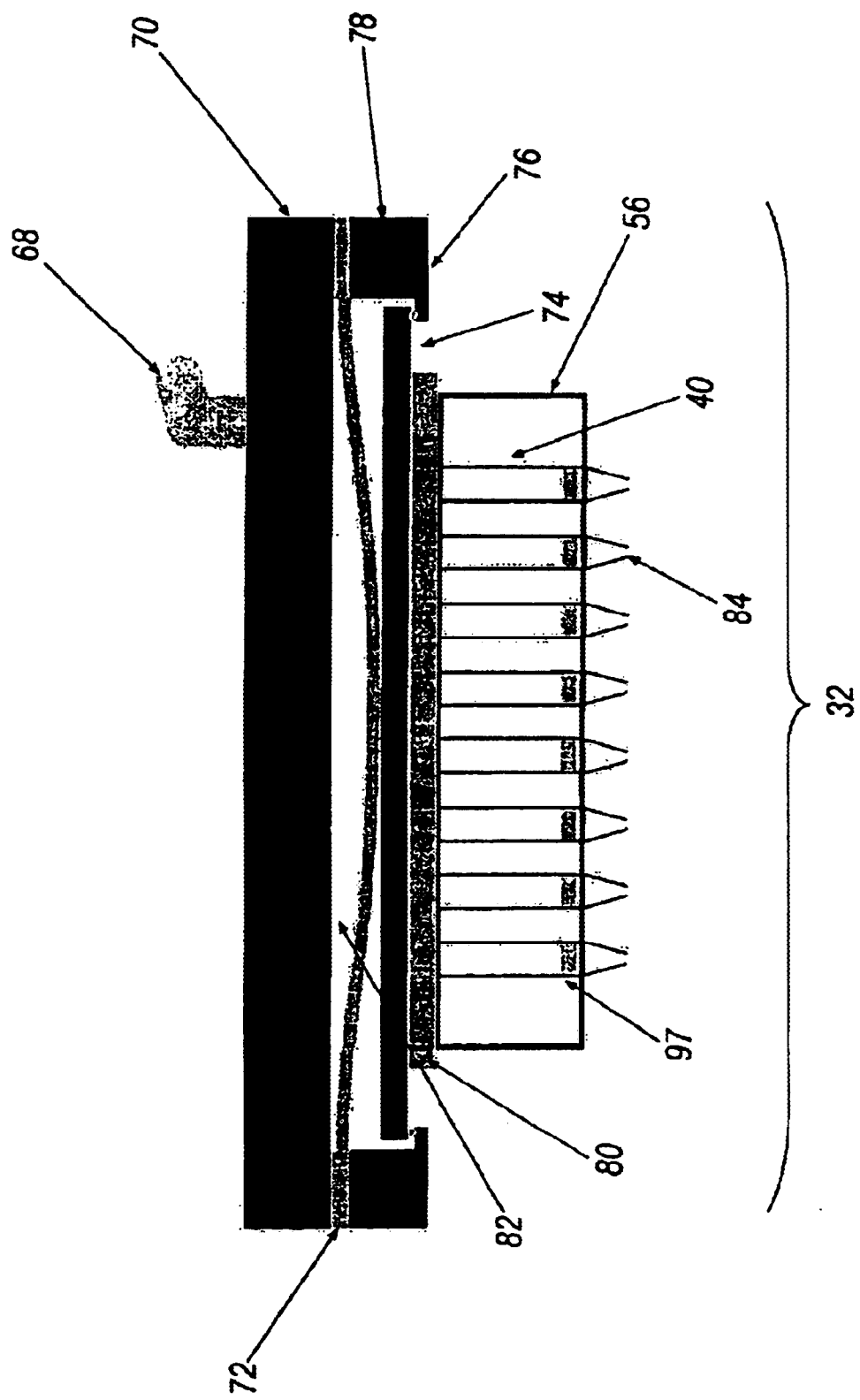
FIG. 7 is a schematic of the drain station is shown when positive pressure is applied.

FIG. 7 illustrates the drain station 32 as gas enters through the pressurized gas inlet 68. A remote pressure source (not shown) feeds pressurized gas into the gas inlet 68 and creates a distensible air space 82, which pushes down the diaphragm 72. The diaphragm 72 in turn pushes down pressure plate 74 and compresses the springs 76. The bottom face of pressure plate 74 has at least one sealing gasket 80 which contact the top face of the synthesis plate 56 located within synthesis block 44. The sealing gasket 80 forms a seal with the synthesis plate 56 so that pressure increases at the synthesis well inlets, and the reagents or liquid within the synthesis wells 40 are pushed through the filters 82 and expelled from the synthesis well outlets 84. Then pressure is turned off, and the springs push up the pressure plate 74 and returns it to its original position until drainage is next needed. In this configuration, the gasket(s) move straight down and straight up: The gaskets contact the synthesis plate 56 with vertical motion. Having a single station for draining of spent liquids and reagents allows for a smaller sealing assembly 72 than is required in automated synthesizers which drain at a variety of locations and require having a sealing assembly for the entire synthesis case. The disclosed drain station leads to a smaller footprint for the polymer synthesizer than is required for the automated synthesizers referenced above.

A personal computer (not shown) is used to control the sequence through which chemicals are added to synthesis wells 40 to produce the desired oligonucleotide in each well. The computer is programmed to control the operation of the valves, the timing of the reactions and the movement of the actuator 46, which in turn moves the synthesis block 44, in short, the entire process. Output of the computer is provided through an input/output (I/O) board, a relay board, and a power supply.

In another embodiment, the inventive polymer synthesizer 10 provides a reagent shelf 12 that is configured to hold the various reagents involved in the synthesis of RNA using a similar protocol to the one disclosed in the example below.

In another embodiment, the inventive polymer synthesizer is configured to accommodate the synthesis of polypeptide chains. In this particular embodiment, one could place resin on top of the filters in the synthesis wells for a support for synthesis. One protocol involves anchoring a first amino acid to the resin, preparing a symmetric anhydride of Fmoc amino acid, and then following the procedure for solid phase peptide synthesis using Fmoc chemistry.

In another embodiment, the filter used for the filter 97 is chosen for its slow passage of fluid, which permits the fluid to gradually pass the support on which the oligonucleotides are synthesized.

In another embodiment, the filter is utilized as the support on which the oligonucleotides are synthesized.

In another embodiment, the automated polymer synthesizer can be used to create polymers other than an oligonucleotide, such as amino acids and RNA.

In another embodiment, the pulley system moves along bearings.

In another embodiment, the pulley system moves along two low-friction surfaces.

In another embodiment, the connecting means of the pulley system is a belt.

In another embodiment, the connecting means of the pulley system is a chain.

In another embodiment, the motive means of the pulley system is connected directly to one of the pulleys.

In other embodiments, the case enclosure is elliptical, square, round or any other convenient shape.

In other embodiments, the pressure plate 74 can be moved by a motor, electromagnet or other means.

Materials are chosen for the various components for their performance qualities in the instrument. For example, gaskets of silicone rubber generally perform well and resist corrosion. Many other parts, including the synthesis case and the synthesis block are made from anodized aluminum. It has been advantageous to have the cable made of stainless steel. Moreover, it is preferable for the tubing for reagent flow to be made of Teflon®, have reagent storage in glass bottles and have fluid valve manifolds made of PEEK®.

EXAMPLE 1

SYNTHESIS OF OLIGONUCLEOTIDES

The disclosed automated polymer synthesizer can be used for the synthesis of oligonucleotides. A multiwell plate is provided with each well 40 containing 30 nanomoles of Controlled Pore Glass (CPG) beads coated with dimethoxytrityl (DMT) protecting group. The multiwell plate is loaded into the synthesis block 44 through an opening in the load station 28. The multiwell plate is sealed into the synthesis block by a gasket and metal frame placed on the periphery of the top of the synthesis block 44. The motor located within the actuator is activated and moves the synthesis block to the water-tolerant filling station 30. 150 µL of Trichloroacetic Acid (TCA) is added into up to 8 wells at one time from a large container 36 at the side of the case 26. The TCA travels from the container 36 through a tube into a valve connected to an eight-channel manifold 24 with eight tubes extending from the manifold to an eight-channel nozzle plate 17. The valve controls how many of the 8 channels the TCA is fed into, and the pulley moves the synthesis block 44 and the multiwell plate under the nozzle plate for delivery of the TCA into the desired number of rows of synthesis wells 40. (See FIG. 2 and detailed description above). The synthesis block 44 is held for 10 seconds allowing for reaction between the TCA and CPG. The TCA removes the DMT protecting group from the CPG.

The pulley then moves the synthesis block 44 to the drain station 32 for pressure filtration. Pressure is activated for 3 seconds, and air pressure pushes down the pressure plate 74, compressing the springs attached to it and exerting pressure on the synthesis wells located in the synthesis block 44. The spent solution containing TCA and DMT protecting group exits the outlets 84 of the synthesis wells 40. The block remains in place for another second while the pressure plate 74 returns to its original position.

The pulley moves the synthesis block 44 back to the water-tolerant filling station 30 and repeats the deblocking step by adding another 150 µL of TCA from large container 36 to the desired number of synthesis wells 40. The synthesis block 44 is then moved to the pressure station 32 and pressure filtered again for 3 seconds. The multiwell plate is held for another second while the pressure plate 74 returns to its original position.

The pulley moves the synthesis block 44 to the water-tolerant filling station 30 and dispenses 100 µL of Acetonitrile (ACN) from a large container 36 located at the end of the case 26 into as many wells as is desired, up to eight at one time. The synthesis block 44 is then moved to the drain station 32, pressure filtered for 3 seconds, and held for another second. These same two steps are repeated, dispensing 200 µL of ACN into the desired number of synthesis wells 40. The same two steps are repeated again dispensing 300 µL ACN into the desired number of synthesis wells 40. These three steps efficiently rinse the synthesis wells 40.

The pulley moves the synthesis block 44 to the water-sensitive filling station 34 to deliver 26.7 µL of a 450 nM Tetrazole in Acefronitrile (ACN) solution, an activator, from a reagent container located above the station 34 to the desired number of synthesis wells 40. The pulley then moves each row of synthesis wells 40 to the appropriate base-dispensing nozzle plate 17 for the addition of 1,200 nmol of a base into the desired number of synthesis wells 40. The synthesis block is held for 45 seconds allowing the base to react with and bind to the CPG. The synthesis block is then moved to the drain station 32 for pressure filtration for 3 seconds, flushing the spent reagents. The block is held for another second while the pressure plate 74 returns to its original position.

The pulley moves the synthesis block 44 to the water tolerant filling station 30, and 30 µL of Cap A and 30 µL Cap B solution are dispensed into the synthesis wells. This step is repeated and the synthesis block is held for 10 seconds to allow a reaction to occur. This capping step terminates the unreacted ends of the oligonucleotides from further synthesis. The pulley moves the synthesis block 44 to the drain station 32 for pressure filtration for 3 seconds. The spent Cap A/Cap B solution exits the synthesis wells 40. The block is held for 1 second while the pressure plate 74 returns to its original position.

The pulley moves the synthesis block 44 to the water-tolerant filling station 30 where 15 µL of a 20 mM $I_2$ oxidizing reagent is added to each synthesis well 40 being utilized for synthesis. The block is held for 30 seconds allowing for a reaction to occur. The synthesis block 44 is moved to the drain station 32 and pressure filtered for 3 seconds, allowing spent reagents to exit the synthesis wells 40. The block is held for another second while the pressure plate 74 returns to its original position.

The pulley moves the synthesis block 44 to the water-tolerant filling station 30 and dispenses 100 µL of Acetonitrile (ACN) from a large container 36 located at the end of the case 26 into as many wells as is desired, up to eight at one time. The synthesis block 44 is then moved to the drain station 32, pressure filtered for 3 seconds, and held for another second while the pressure plate 74 returns to its original position. These same two acetonitrile and filtration steps are repeated dispensing 200 µL of ACN into the desired number of synthesis wells 40. The same two steps are repeated again dispensing 300 µL ACN into the desired number of synthesis wells 40.

This second washing step is repeatedly followed by the addition of TCA, pressure filtration, the first washing step, the addition of Tetrazole, pressure filtration, the addition of desired bases, pressure filtration, addition of Cap A and Cap B, pressure filtration, addition of an oxidizing reagent, and pressure filtration. This cycle is repeated for each synthesis well until the desired oligonucleotides are synthesized.

It is to be understood that the above description is intended to be illustrative and not restrictive. Many embodiments will be apparent to those of skill in the art upon reviewing the above description. The scope of the invention should be determined not with reference to the above description but should instead be determined with reference to the appended claims, along with the full scope of equivalents to which such claims are entitled.

We claim:
1. A polymer synthesizing apparatus comprising
   a. a base on which sits a synthesis case, a synthesis block, a means of moving the synthesis block and the lower ends of supports for a reagent shelf;
   b. the synthesis case comprising a load station, drain station, an aqueous reagent filling station, and a non-aqueous reagent filling station; the synthesis case hav- ing a cover, a first and a second side, a first and a second end, and a bottom side which contacts the base;

c. the bottom side of the synthesis case having a top face in which there are tracks for the synthesis block;

d. the synthesis block being capable of moving back and forth on the tracks in the synthesis case, the synthesis block having a top face and an opening in the top face for a multiwell plate, the synthesis block also having a collection area under the multiwell plate to drain spent reagents and to optionally accommodate a sample tray;

e. a means of moving the synthesis block back and forth on the tracks in the synthesis case;

f. the load station comprising a sealable opening in the synthesis case through which a multiwell plate can be inserted into the synthesis block;

g. said reagent shelf connected to the upper ends of the supports, one or more reagent containers, each having a tube connecting to a gas source, the gas source having the effect of expelling a controlled amount of reagent from the container, and a tube for dispensing the reagent, the tube connecting at its other end to valves that have additional tubes connected to multi-channel manifolds, which in turn have tubes connecting to nozzle blocks at the aqueous and non-aqueous filling stations;

h. the valves being actuated by a computer to dispense fluid to desired wells in the multiwell plate; and i. a means of draining liquid from the multiwell plate.

2. The polymer synthesizer of claim 1 wherein the means of moving the synthesis block comprise a pulley, cable and motor.

3. The polymer synthesizer of claim 1 wherein the means of draining the liquid from the multiwell plate comprises a means for applying a positive pressure above the multiwell plate to force liquid to drain.

4. The polymer synthesizer of claim 1 wherein the means for draining the liquid from the multiwell plate comprises:
a pressurized gas source,
a pressurized gas inlet on the synthesis case,
a pressure plate,
a support block,
a diaphragm which forms a seal between the top plate and one side of the pressure plate and the support block,
a motive means connected to the pressure plate and capable of moving the pressure plate up,
and at least one sealing gasket to contact and form a seal with the multiwell plate,
whereby gas enters through the pressurized gas inlet and presses down the diaphragm, which in turn lowers the pressure plate and gasket to form a seal over the multiwell plate and increases pressure above the wells, which expels the liquid contents of the wells.

5. The draining means of claim 4, wherein the motive means is a set of springs.

6. The polymer synthesizer of claim 1 wherein the tracks in the synthesis case are coated with polytetrafluoroethylene.

* * * * *